United States Patent [19]
Cederblad et al.

[11] Patent Number: 5,390,106
[45] Date of Patent: Feb. 14, 1995

[54] ANALYSIS OF DISTURBANCES IN POWER SYSTEMS

[75] Inventors: Lars Cederblad, Västerås; Roland Orre, Täby, both of Sweden

[73] Assignee: Asea Brown Boveri AB, Vasteras, Sweden

[21] Appl. No.: 901,233

[22] Filed: Jun. 19, 1992

[30] Foreign Application Priority Data

Jun. 26, 1991 [SE] Sweden ................... 9101966

[51] Int. Cl.⁶ ............... G06F 15/22; G08B 21/00; H02H 3/20
[52] U.S. Cl. ................... 364/401; 340/664; 361/90
[58] Field of Search ............ 364/401, 400; 340/521, 340/664, 657–659; 361/90, 94

[56] References Cited
U.S. PATENT DOCUMENTS 3,813,667 5/1974 Smith ................... 340/248
5,115,226 5/1992 Schweitzer, III ................... 340/664

*Primary Examiner*—Gail O. Hayes
*Assistant Examiner*—X. Chung-Trans
*Attorney, Agent, or Firm*—Watson, Cole, Grindle & Watson

[57] ABSTRACT

A method for extracting, after data collection (DC) of a sampled analog signal (x(k)), a logical description of the signal by identification of the state (A, $\phi$) of the signal, that is, the amplitude and phase of the signal, as well as an event ($\Delta A$, $\Delta\phi$, k=h) which causes a change of a state at a sample k=h, that the identification (SE) is performed with the aid of a truncated general Fourier series with an exponentially decreasing constant, and that the identified parameters are supplied as input data to an expert system (ES) for forming the basis of a superordinate fault analysis together with binary data originating from other signals, the result thereof then being readable on a user interface (UI) (FIG. 6).

5 Claims, 2 Drawing Sheets

ANALYSIS OF DISTURBANCES IN POWER SYSTEMS

TECHNICAL FIELD

The introduction of numerical protection systems and disturbance recorders in electrical power systems entails the production of enormous amounts of information on each occurrence of a disturbance. To make this information available for either operating or maintenance decisions, the introduction of automatic filtering of the information is required. The introduction of such a function may, for example, save the operating personnel the work of screening the information and makes it possible to obtain information very rapidly about faults in the power system.

The information which is to be processed is a mixture of analog, sampled measured values as well as binary status indications. This information is collected by disturbance recorders at various locations in the power system.

A suitable analysis method comprises applying to this information a number of rules in a so-called expert system, with the aid of which the fault condition can be analyzed in detail. However, in this connection a problem arises since this sequence of sampled analog measured values cannot be used in a simple and direct manner as input data to the expert system.

The present invention suggests a method for treating the analog, sampled values, which can then be used by the expert system.

BACKGROUND ART, THE PROBLEMS

An expert system for treatment of both analog and binary information from a disturbance recorder is described in a report by K. Salo: "Expert System for the Analysis of Disturbances", presented at the Symposium on Expert System Applications to Power Systems, Stockholm-Helsinki 1988. However, the report does not deal with how the analog information is to be preliminarily treated before it is supplied as input data to the expert system.

In a report by B. Hakavik, et al: "Knowledgebased Registration of Disturbance Data", also presented at the above-mentioned symposium, an expert system for analysis of binary information or alarm is described. The main purpose of the applications described in the report, however, is to reduce the number of alarms to which a human operator is exposed. The analysis is performed by grouping the alarms, by means of logical conditions, into a number of different primary events.

Analog signals have been treated by expert systems for analysis of vibrations. This has been a relatively successful application when it comes to studying, for example, vibrations from a steam turbine. However, these systems are based on frequency domain analysis of the analog signals, whereby the time related aspects are to a certain extent lost.

Systems for automatic analysis of ECG (electrocardiogram) signals have also been described in the literature. This is basically analysis of analog signals with the aid of expert systems; see, inter alia, "A Contribution to the Automatic Processing of Electrocardiograms Using Syntactic Methods", by G. Belforte, et al, published in IEEE Trans. on Biomedical Eng., Vol. BME-26, No. 3, March 1979, pp. 125-136, and EP application EP 0 292 351 A1, "Systeme de traitement de signal". The methods described are based on techniques using pattern recognition, whereby a classification into an finite number of patterns takes place. The method is primarily applied where it is desired to identify a number of previously known signal patterns.

There is a need for expert systems for analysis of both analog and binary signals from electric power systems. In such a system it is highly desirable to be able to describe both analog and binary signals in a similar manner. The representation of the analog signals which is aimed at is a representation similar to that used for binary signals, that is, either true or false within a certain time interval. The prior art described above for analysis using expert systems, however, proposes no such representation of analog signals.

SUMMARY OF THE INVENTION

The invention aims to extract a logic description of an analog signal starting from a series of sampled values $x(k)$ with the sampling time $T_s$ of this signal. Thus, the signal $x(k)$ is only defined for $k=1, 2, \ldots h-1, h, h+1, \ldots n-1, n$, which sampled values are collected in an input data file. An event will always occur between two samples but, by definition, the event will henceforth have taken place at the immediately following sample.

To explain the basis of the invention, an arbitrary point can be the starting-point, where a stationary sinusoidal current or voltage with a given frequency and amplitude is changed instantaneously into a stationary sinusoidal signal with the same frequency but with changed amplitude and phase position. A partially sinusoidal stationary signal can then be divided into a number of "states", each one being characterized by a constant amplitude and a constant phase position in relation to a given reference.

The state parameters for two consecutive states may, for example, be described as follows:

|  | State 1 | State 2 |
| --- | --- | --- |
| Amplitude: | 1.0 | 2.0 (A) |
| Relative phase position: | 0 | 90 ($\phi$) |
| Start sample (time): | $k = 1$ | $k = h$ |
| End sample (time): | $k = h - 1$ | $k = n$ |

The transition from one state to another creates an "event", which is described by the sample or the time at which the event occurs as well as an amplitude and/or phase change. Consequently, the event which brings about the above-mentioned change of state can be described as:

| Event 1 | | |
| --- | --- | --- |
| Event sample: | $k = h$ | |
| Amplitude change: | +1.0 | ($\Delta A$) |
| Phase change: | +90 | ($\Delta \phi$) |

Under the detailed description of the invention given below, it will be proved that the combination of events and states makes it possible to analyze a process in a rule-based system.

Although all times have been indicated here in discrete time, that is, by $k=1, 2, \ldots$, this is quite equivalent to indicating x in continuous time, apart from x not being defined between the sample times. However, in the sampled system no event on the sampled signals can be indicated with better accuracy than what is allowed by the sampling interval.

Generally, a signal x(k) which is defined by a number n of samples, that is, where k=1, 2, ..., n, may have more than one event and more than two states. If it is assumed that events occur at samples k equal to $h_1$, $h_2$, ... $h_p$, the number of states within the scope of the n samples will be equal to p+1. Each state has a given/calculated start and end sample, $k_1$ and $k_2$, respectively. Thus, the following applies:

| State 1: | $k_1 = 1$ | $k_2 = h_1 - 1$ |
| State 2: | $k_1 = h_1$ | $k_2 = h_2 - 1$ |
| State p + 1: | $k_1 = h_p$ | $k_2 = n$ |

The process of extracting events and states from a sampled analog signal may be divided into two steps. Step 1 is intended to be a fast identification of the events, later on in the description designated a "raw event identification", in the supervised signal. In step 2, the states and the events are filtered by identifying the state and event parameters of the signal in an interval given by the raw event registration in step 1. The event and state parameters obtained in this way may be used as input signals to a new type of expert system for forming, together with binary data, the basis for the superordinate analysis of electric power systems.

DETAILED DESCRIPTION OF THE INVENTION

Figure 1:
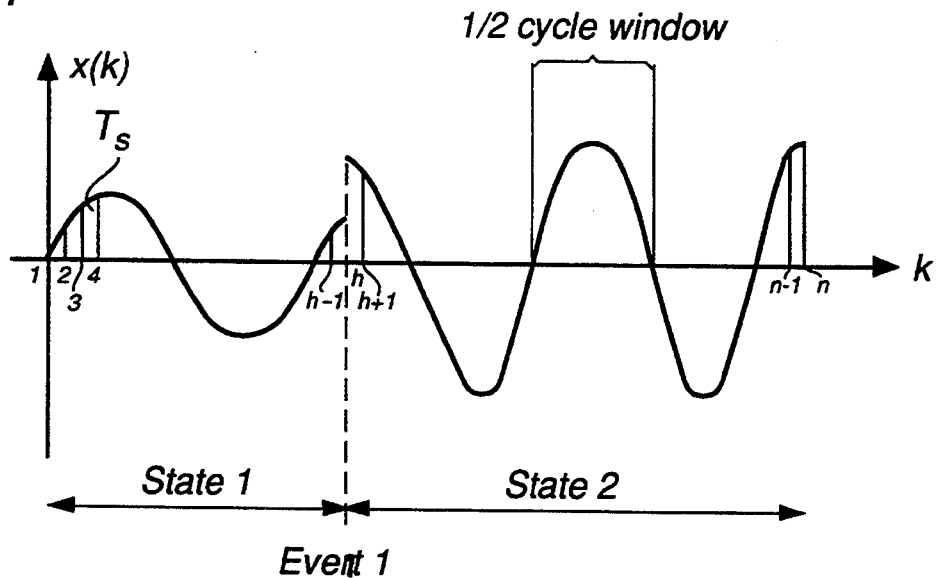
FIG. 1 shows a partially sinusoidal stationary signal.

FIG. 1 shows a partially sinusoidal stationary signal which is characterized by two separate "states" and an "event" which separates the states, as described under the summary of the invention above, and the state parameters indicated there. It is clear from the figure that the event occurs at a sample with k=h, that the state 1 is defined as comprising the samples from k=1 to k=h−1 and that the event 2 is defined as comprising the samples k=h to k=n. As shown in FIG. 1, $T_s$ indicates the sampling interval or the sampling time.

Figure 2:
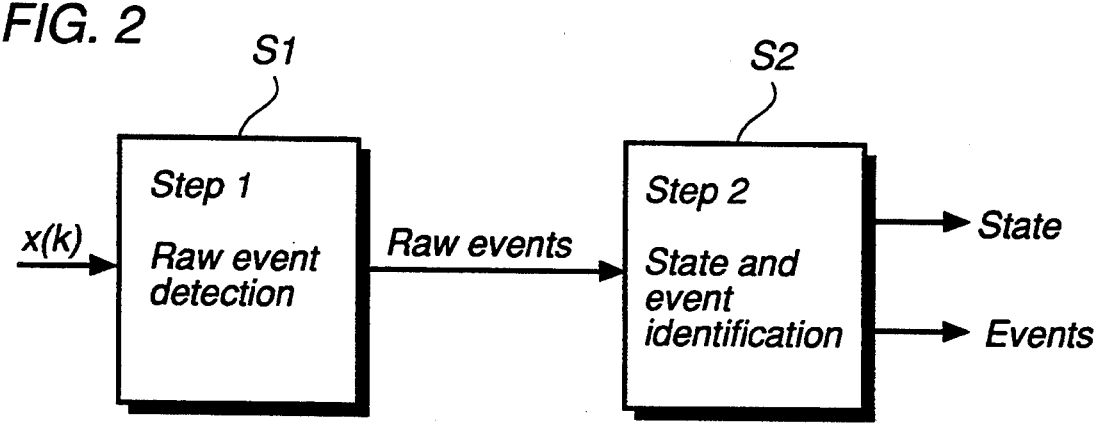
FIG. 2 is a schematic view of the extraction process for obtaining, from a sampled analog signal, the event and state parameters.

FIG. 2 shows the two steps in the extraction process, mentioned in the above description. Sampled values x(k) of the input signal are passed to step 1, S1, for raw event detection. The raw events which are detected are passed, together with x(k), to step 2, S2, where a state and event identification takes place.

To be able to describe the contents of the two steps more closely, the following designations are also needed, in addition to the designations A, ΔA, $\phi$, Δ$\phi$, x(k) and "k", namely:

| $\hat{x}$ (k) | the estimated input signal ("x circumflex") |
| $\tilde{x}$ (k) | the estimation error for the input signal ("x tilde") |
| $T_S$ | sampling time, time between each sample |
| $\omega$ | basic angular frequency of the input signal |
| N | number of terms in a truncated Fourier series |
| L | number of samples in a window, window length in discrete time |
| a, b | coefficients in a mathematical model of the input signal (see equation (1)). |

Generally, an estimated signal can be described with the aid of a truncated Fourier series and an exponentially decreasing constant part according to the following:

$$x(k) = a_0\exp(-b_0k) + \sum_{i=1}^{N} [a_i\cos(i\omega kT_s) + b_i\sin(i\omega kT_s)] \quad (1)$$

The raw event detection in step 1 must be sensitive to be able to detect fast consecutive events. For this reason, in one embodiment of the invention, a half-cycle Fourier filter will be used, as exemplified in FIG. 1, with a number of samples $L=\pi/\omega T_s$. Thus, a sliding window is used which, during the calculation, is successively moved one sample at a time.

Figure 3:
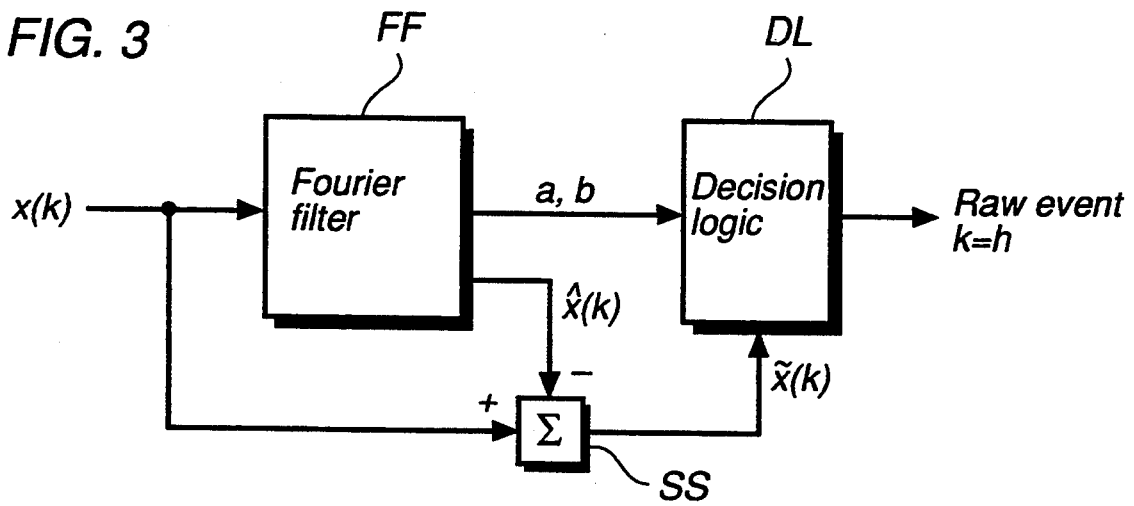
FIG. 3 shows how a raw event detection according to the invention may be performed.

Otherwise, the filtering is performed as shown in FIG. 3. The sampled values x(k) of the signal are passed to the Fourier filter FF which in one embodiment utilizes a truncated Fourier series with only one fundamental component to estimate its coefficients a and b. Thus, the estimated signal $\hat{x}(k)$ is described as $$\hat{x}(k) = \hat{a}\cos(k\omega T_s) + \hat{b}\sin(k\omega T_s) \quad (2)$$

To the decision logic DL which is included in step 1 to determine whether a raw event has taken place there is passed, besides the estimated values of a and b, also the difference between actual and estimated signal, which difference is formed in a summator SS.

Figure 4:
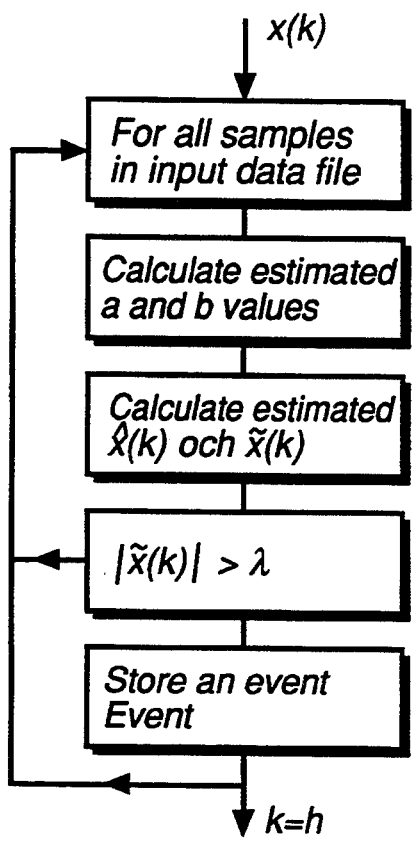
FIG. 4 illustrates a flow diagram for raw event detection.

A flow diagram which describes the raw event detection in step 1 is shown in FIG. 4. For all the samples in the input data file, estimated values of a and b are computed according to $$\hat{a}(k)=\hat{a}(k-1)+2x(k)[\cos\{k\omega T_s\}-\cos\{(L-k)\omega T_s\}]/L \quad (3)$$

$$\hat{b}(k)=\hat{b}(k-1)+2x(k)[\sin\{k\omega T_s\}-\sin\{(L-k)\omega T_s\}]/L \quad (4)$$

Then the estimated signals $\hat{x}(k)$ and the difference $\tilde{x}(k)$ between estimated and calculated values are calculated, that is, $$\hat{x}(K)=\hat{a}(k)\cos\{k\omega Ts\}+\hat{b}(k)\sin\{k\omega T_s\} \quad (5)$$

$$\tilde{x}(k)=x(k)-\hat{x}(k) \quad (6)$$

With the aid of this difference signal (6), the decision logic is able to determine when a raw event occurs on the signal x(k), that is, according to FIG. 1 when k=h. The decision is made when $$|\hat{x}(k=h)|>\lambda \quad (7)$$

where λ is related to the amplitude of the signal according to $$\lambda=\delta\sqrt{[\hat{a}^2(h-1)+\hat{b}^2(h-1)]} \quad (8)$$

and where δ is the accuracy coefficient related to the desired accuracy.

In one embodiment of the invention, the following applies:

$$0.05 < \delta < 0.15 \tag{9}$$

It should be pointed out that the estimation error equation according to (6) and the difference (7) is valid in general and independently of how many terms in equation (1) that will be used for the estimation.

By continuously monitoring when the absolute amount of the difference signal exceeds this limit value, the time or the k-value for an event can be determined.

The objective of the identification in step 2 is to identify the states between the different events in the signal in a more accurate way. This identification is also generally based on the general description of the signal according to equation (1). It is then suitable that the number of terms in the Fourier series with associated coefficients that are to be determined depend on how many samples are available for the state in question. In one embodiment, the model implemented in step 2 is arranged according to the invention such that the number of terms and coefficients, respectively, which are to be used depending on the number of available samples in the state are as follows:

| Number of samples | Coefficients of the model |
|---|---|
| <20 | $a_1, b_1$ |
| 20–30 | $a_0, a_1, b_1$ ($b_0 = 0$) |
| 30–40 | $a_0, a_1, b_0, b_1$ |
| >40 | $a_0, a_1, b_0, b_1, a_2, b_2$ |

Figure 5:
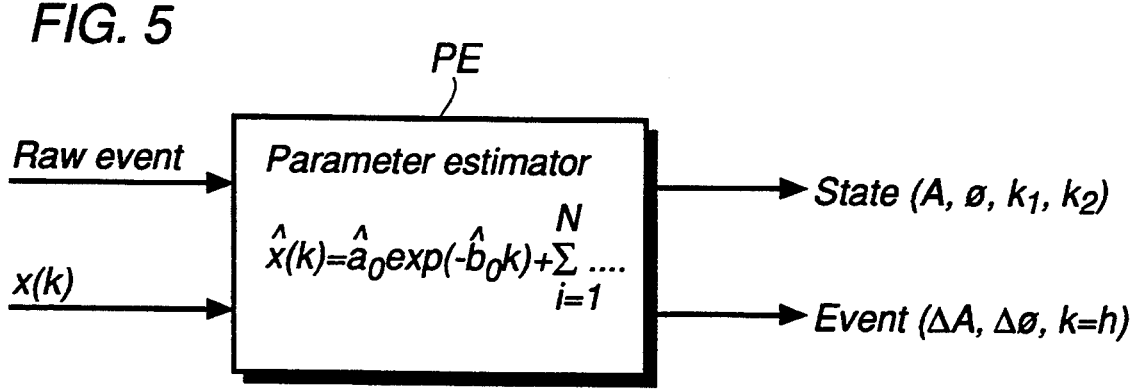
FIG. 5 shows a block diagram for step 2.

A block diagram for step 2 is shown in FIG. 5. The parameter estimator PE is supplied with identified raw events, that is, the values of k when k=h as well as the stored sampled values x(k) of the input data file. On the basis of estimated parameters, a state is defined by A, $\phi$, k=1, k=h−1 and an event as a change of A and $\phi$ as well as the event sample, that is, $\Delta A$, $\Delta\phi$ and k=h.

There are a plurality of different methods to use for the coefficient estimation. According to the invention and in the model, however, a method based on a minimization of the quadratic error, that is, a so-called LS method (Least Square) is used. The purpose of using a model which models more coefficients than those which directly describe the state is to achieve as good an estimation of the fundamental component as possible.

The identification is carried out according to the invention as a complete calculation for the whole state, and no calculation with a sliding window is performed. The reason for this is that all the samples are available for the states.

The procedure is then repeated for all states.

By identifying the states of the raw events recorded in step 1 and then checking the difference between two adjacent states, possible false events may be suppressed and the two adjacent states be joined. Thereafter, a new identification is made, now with a larger number of available sample points. In this way the accuracy can be considerably increased.

The amplitude and phase and the amplitude and phase difference, respectively, for each state are calculated as:

$$A = \sqrt{(\hat{a}_m^2 + \hat{b}_m^2)} \tag{10}$$

$$\phi = \arctan\left(\frac{\hat{b}_m}{\hat{a}_m}\right) \tag{11}$$

where index "m" indicates a sample in the middle of the state, that is, $$m = (k_1 + k_2)/2 \tag{12}$$

$$\Delta A = \sqrt{(\hat{a}_h^2 + \hat{b}_h^2)} - \sqrt{(\hat{a}_{h-1}^2 + \hat{b}_{h-1}^2)} \tag{13}$$

$$\Delta\phi = \arctan\left(\frac{\hat{b}_h}{\hat{a}_h}\right) - \arctan\left(\frac{\hat{b}_{h-1}}{\hat{a}_{h-1}}\right) \tag{14}$$

This procedure is repeated until the difference between the states is sufficiently great for both amplitude and/or phase, for example when the differences are greater than 10% of the current amplitude and phase values, respectively. To sum up, the procedure comprises the following processing steps:

1. Estimate the states (A, $\phi$, k=1, k=h−1) between given event samples (points in time).
2. Determine the events (k=h, $\Delta A$, $\Delta\phi$), remove events with too small change.
3. If an event is removed, return to point 1.
4. When the event criteria are fulfilled, the event values are supplied as input data to the expert system for further evaluation.

Figure 6:
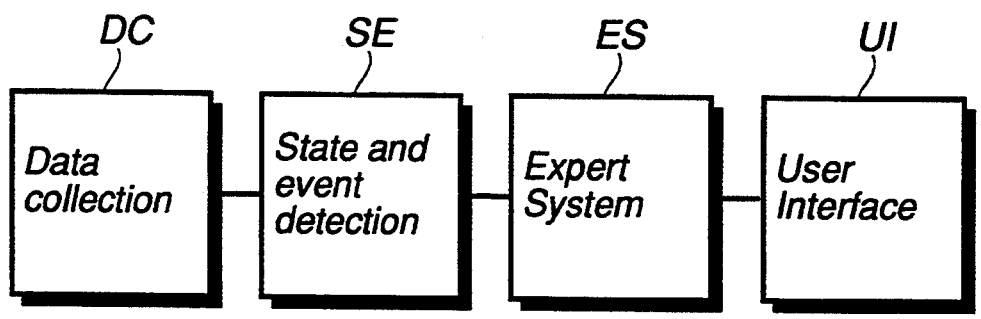
FIG. 6 shows a block diagram for diagnosis.

By representing the analog signals in the form shown, it will be possible, as mentioned before, to process these signals together with binary signals in an expert system. FIG. 6 shows a block diagram of a complete system for diagnosis with data collection, DC, state and event detection SE according to the invention and the subsequent expert system ES. The evaluation of the expert system is then clear from a suitable user interface UI, which may be a visual display unit and/or a printout from some connected printer. In the expert system, the signals and their sequence of states are checked against a number of rules which characterize, for example, different faults in a power system. An example of such a rule are the following criteria for detecting a single-phase ground fault:

If an Event is identified in the current of one phase with the amplitude change $\Delta A$ at the sample point k=h, and If an Event is identified in the zero sequence current with the amplitude change $\Delta A_0$ at the same sample point, and If $\Delta A_0$ and $\Delta A > 10\%$ of the rated current, Then a phase-to-ground fault has occurred in that phase at the sample point k=h.

An expert system comprises a great number of rules concerning faults in a power system as well as faults in circuit breakers or relay and control systems.

We claim:

1. A method for obtaining signal outputs signifying fault determinations of an electrical signal, represented by x(k), wherein said electrical signal has different states, with a state being defined by a constant amplitude (A) and a constant phase (0) relative to a given amplitude and phase reference, and each of said different states being caused by a raw event representing a disturbance in said electrical signal, comprising the steps of:

detecting the actual state of said electrical signal;
detecting the raw event causing a change of the state of said electrical signal;

said steps of detecting the state and raw event including the step of sampling the electrical signal and operating with a truncated general Fourier series with an exponentially decreasing constant part to obtain an estimated error signal according to the equation:

$$\hat{x}(k) = \hat{a}_0 \exp(-\hat{b}_0 k) + \sum_{i=1}^{N} [\hat{a}_i \cos(i\omega k T_s) + \hat{b}_i \sin(i\omega k T_s)]$$

where, N=the number of terms in the truncated Fourier series; $\omega$=the basic angular frequency of the input signal: $T_s$=the sampling time; and deriving an estimation error signal:

$$\tilde{x}(k) = x(k) - \hat{x}(k)$$

as a difference signal between the actual electrical signal and said estimated error signal;

detecting the occurrence of a raw event at sample k=h from said difference signal $\tilde{x}(k)$ and the estimated coefficients a and b in a decision logic circuit when $$|\tilde{x}(k = h)| > \lambda$$

where:

$$\lambda = \delta \sqrt{[\hat{a}^2(h-1) + \hat{b}^2(h-1)]}$$

where $\delta$ is an accuracy coefficient depending on the desired accuracy in the step of detecting the raw event; detecting the amplitude (A) and phase (0) for each state of the different states of said electrical signal and which comprises samples $k_1$ to $k_2$ according to:

$$A = \sqrt{(\hat{a}_m^2 + \hat{b}_m^2)}$$

$$\phi = \arctan(\hat{b}_m/\hat{a}_m)$$

where:

m—$(k_1+k_2)/2$ and the event $\Delta A$ and $\Delta \phi$ according to:

$$\Delta A = \sqrt{(\hat{a}_h^2 + \hat{b}_h^2) - \hat{a}_{(h-1)}^2 + \hat{b}_{(h-1)}^2}$$

-continued $$\Delta \phi = \arctan \hat{b}_h/\hat{a}_h - \arctan (\hat{b}_{(h-1)}/\hat{a}_{(h-1)}); \text{ and}$$

supplying the states A, $\phi$, k=1, k=n and the events $\Delta A$, $\Delta A$, and k=h as respective signal outputs for determination of electrical faults on said electrical signal.

2. A method for obtaining signal outputs signifying fault determination of an electrical signal according to claim 1, further comprising the step of detecting the raw event by receiving the sampled values x(k) having only one fundamental component to determine the estimated signal from a half-cycle Fourier filter as:

$$\hat{x}(k) = \hat{a} \cos (k \omega T_s) + \sin (k \omega T_s)$$

where:

$$\hat{a}(k) = \hat{a}(k-1) + 2x(k)[\cos\{k\omega T_s\} - \cos\{(L-k)\omega T_s\}]/L$$

$$\hat{b}(k) = \hat{b}(l-1) + 2x(k)[\sin\}k\omega T_x\} - \sin\}(L-k)\omega T_s\}]/L$$

with

L=number of samples in the window for the used half-cycle filter, and supplying said a— and b— coefficients together with the current fault estimation signal to said decision logic circuit.

3. A method for obtaining signal outputs signifying fault determination of an electrical signal according to claim 1, wherein the number of terms (N) in the truncated series in said setps of detecting is determined based on a number of samples according to:

| Number of samples | Coefficients of the model |
|---|---|
| <20 | $a_1, b_1$ |
| 20–30 | $a_0, a_1, b_1, (b_0 = 0)$ |
| 30–40 | $a_0, a_1, b_0, b_1$ |
| >40 | $a_0, a_1, b_0, b_1, a_2, b_2$. |

4. A method for obtaining signal outputs signifying fault determination of an electrical signal according to claim 1, wherein the accuracy coefficient ($\delta$) has a value:

$$0.05 < \delta < 0.15.$$

5. A method for obtaining signal outputs signifying fault determination of an electrical signal according to claim 1, wherein the coefficient estimation parameter estimator in said step of detecting the state and raw event includes the step of minimizing the quadratic error.

* * * * *

UNITED STATES PATENT AND TRADEMARK OFFICE
CERTIFICATE OF CORRECTION

PATENT NO.  : 5,390,106

DATED       : Feb. 14, 1995

INVENTOR(S) : Cederblad et al.

It is certified that error appears in the above-identified patent and that said Letters Patent is hereby corrected as shown below:

Claim 1, column 7, line 49, that portion of the line reading " $m-(k_1+k_2)/2$ ", should read -- $m = (k_1 + k_2)/2$ --.

Claim 1, column 7, line 54, " $\Delta A = \sqrt{(\hat{a}_h^2 + \hat{b}_h^2) - \hat{a}_{(h-1)}^2 + \hat{b}_{(h-1)}^2)}$ " should read -- $\Delta A = \sqrt{(\hat{a}_h^2 + \hat{b}_h^2)} - \sqrt{(\hat{a}_{h-1}^2 + \hat{b}_{h-1}^2)}$ --.

Claim 2, column 8, line 14, " $\hat{x}(k) = \hat{a} \cos(k\omega T_s) + \sin(k\omega T_s)$ " should read -- $\hat{x}(k) = \hat{a} \cos(k\omega T_s) + \hat{b} \sin(k\omega T_s)$ --.

In the specification, at column 4, line 31, " $\hat{x}(k) = a \cos(k\omega T_s) + \hat{b} \sin(k\omega T_s)$ " should read -- $\hat{x}(k) = \hat{a} \cos(k\omega T_s) + \hat{b} \sin(k\omega T_s)$ --.

Claim 2, column 8, line 20, " $\hat{b}(k) = \hat{b}(l-1) + 2x(k)[\sin\}k\omega T_x) - \sin\}(L-k)\omega T_s\}]/L$ " should read -- $\hat{b}(k) = \hat{b}(k-1) + 2x(k)[\sin(k\omega T_s) - \sin\{(L-k)\omega T_s\}]/L$ --.

Claim 3, column 8, line 32, the term "setps" should read -- steps --.

Signed and Sealed this

Second Day of February, 1999

Attest:

*Acting Commissioner of Patents and Trademarks*

Attesting Officer